United States Patent [19]

Lask

[11] Patent Number: 4,975,226

[45] Date of Patent: Dec. 4, 1990

[54] PROCESS FOR MAKING GREEN BRIQUETTES FOR FORMING SI OR SIC

[75] Inventor: Gert-Wilhelm Lask, Berus, Fed. Rep. of Germany

[73] Assignee: Applied Industrial Materials Corporation AIMCOR, Deerfield, Ill.

[21] Appl. No.: 220,616

[22] Filed: Jul. 18, 1988

[30] Foreign Application Priority Data

Jul. 24, 1987 [DE] Fed. Rep. of Germany ....... 3724541

[51] Int. Cl.⁵ ............................................. C01B 31/00
[52] U.S. Cl. ..................................... 264/29.5; 264/63; 264/234
[58] Field of Search ................ 264/29.1, 63, 234, 29.5

[56] References Cited

U.S. PATENT DOCUMENTS

| 4,364,974 | 12/1982 | Lask | 427/213 |
| 4,366,137 | 12/1982 | Lask | 423/350 |
| 4,820,341 | 4/1989 | Lask | 75/10.61 |

FOREIGN PATENT DOCUMENTS

| 2088840 | 9/1983 | United Kingdom . |
| 2084122 | 3/1984 | United Kingdom . |
| 2150128 | 7/1987 | United Kingdom . |

*Primary Examiner*—James Derrington
*Attorney, Agent, or Firm*—Herbert Dubno; Andrew Wilford

[57] ABSTRACT

A process and apparatus for the preparation of green briquettes for the production of silicon or silicon carbide or ferrosilicon in electric pit furnaces, quartz sand, a carbon carrier and a bituminous binder being mixed together, the mixture being shaped into blanks from which the green briquettes are formed by heat treatment. The process is performed with the use of blanks which are free from melted bituminous caking coal and whose specific weight is made greater than the bulk density of quartz sand by adjustment of the proportions of the mixture and by compacting. The blanks are introduced for the heat treatment into a heated rotating drum furnace whose lower part is filled with quartz sand to an extent such that the heat treatment proceeds in a dip bed of quartz sand.

12 Claims, 1 Drawing Sheet

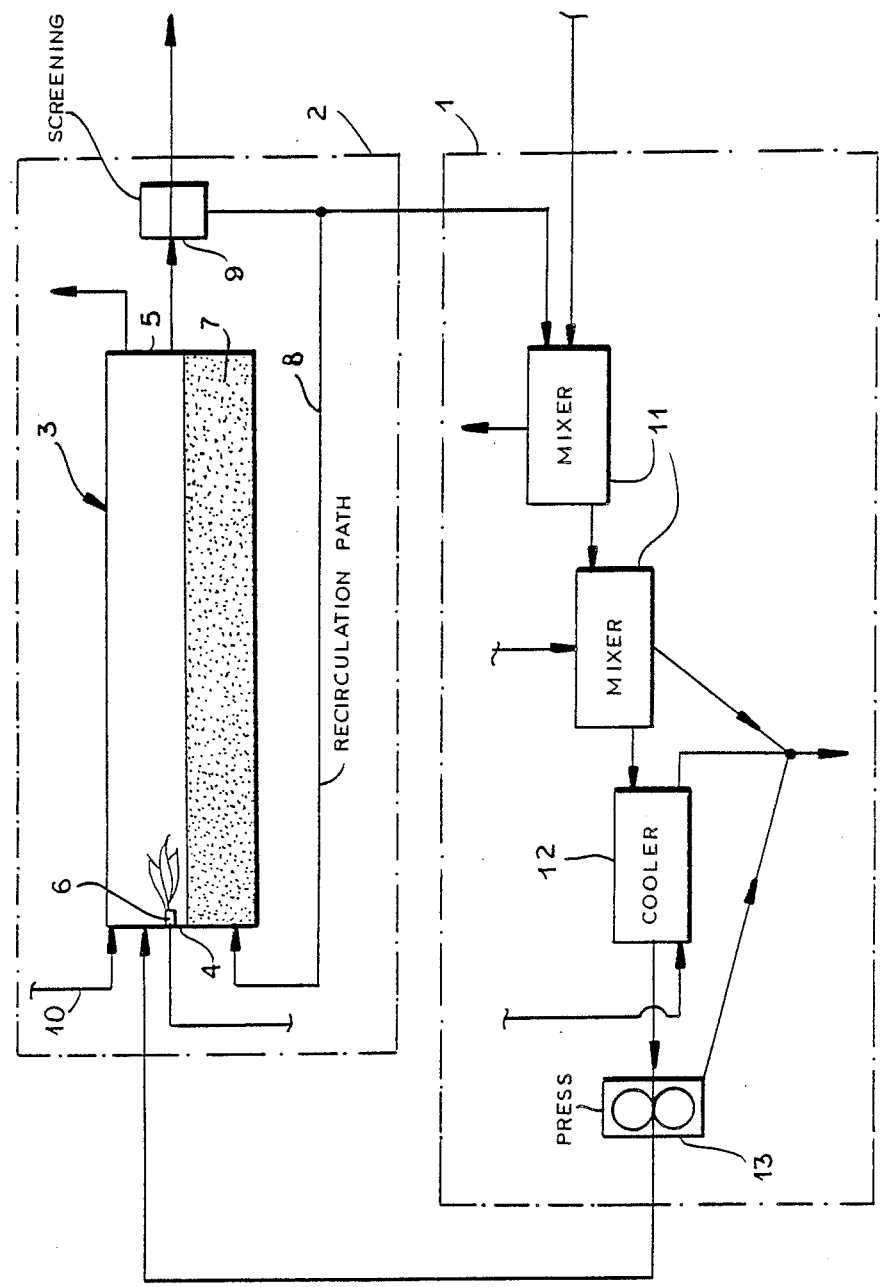

PROCESS FOR MAKING GREEN BRIQUETTES FOR FORMING SI OR SIC

CROSS REFERENCE TO RELATED SUBJECT MATTER

This application is related to Ser. No. 865,164 filed 20 May 1986 (now U.S. Pat. No. 4,820,341) and 275,159 filed 26 Nov. 1984 now U.S. Pat. NO. 4,364,974, and related to U.S. Pat. No. 4,366,137 issued 28 Dec. 1982 and 4,364,974 issued on 21 Dec. 1982.

FIELD OF THE INVENTION

My present invention relates to a process and apparatus for the production of green briquettes for the formation of silicon or silicon carbide or ferrosilicon in low-shaft electric furnaces.

BACKGROUND OF THE INVENTION

In the production of silicon, silicon carbide or ferrosilicon, quartz sand, a carbon carrier and a bituminous binder can be mixed together and the mixture shaped into blanks from which green briquettes are formed.

As a rule, quartz sand in a range of grain sizes of from 0.05 to 0.2 mm is used for the preparation of briquettes of this kind, a variety of particle size ranges employed between these limits. Of course, for the preparation of ferrosilicon finely divided iron or finely divided iron oxide can also be added to the green briquettes.

Green briquettes for the purposes specified must comply with special chemical and physical requirements. For example, and as can be gathered from U.K. Patent No. 2 084 122, an important chemical consideration in the preparation of silicon is that as the green briquettes pass through the low-shaft electric furnace, silicon carbide may first form in the top part in accordance with the equation:

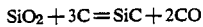

$$SiO_2 + 3C = SiC + 2CO$$

The total carbon content of the individual green briquettes must be adjusted correspondingly It is usually adjusted to a hyperstoichiometric level (cf. U.K. Patent No. 2 150 128). From the physical angle it must be ensured that, as the green briquettes pass through the furnace, they do not disintegrate, especially during the reduction to SiC, in order to react in the bottom part of the furnace with molten quartz of the charge in accordance with the equation:

$$SiO_2 + SiC = 3Si + 2CO$$

Of course, other reactions also occur in the furnace. One of them is the formation in accordance with the formula:

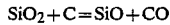

$$SiO_2 + C = SiO + CO$$

at the high furnace temperatures of silicon monoxide, some of which is lost, with detriment to the yield and the heat balance. In practice, the only possible way of preparing green briquettes for the production of silicon in a manner satisfying chemical and physical requirements has been to use hot briquetting (c.f. U.K. Patent No. 2 088 840).

This hot briquetting process produces, at temperatures around 500° C., briquettes containing molten or fused caking coal as the bituminous binder. The melting point of this coal binder, which may be between 350° and 450° C., must be exceeded during briquetting if the molten coal is to be distributed satisfactorily in the material to be bound and if the blank is to be consolidated by the formation of semicoke.

A very important factor in briquette quality has been a special heat treatment in which the blanks are stored substantially at their briquetting temperature in insulated bunkers for several hours—i.e., a heat treatment or tempering and using the intrinsic heat of the blanks thereby doubling the strength of the briquettes.

However, it has been found that preparing green briquettes for the production of silicon or silicon carbide or ferrosilicon by hot briquetting is relatively costly.

Another disadvantage when there are stringent purity requirements for the products to be produced from the briquettes is that impurities may be taken up into the briquettes during hot briquetting either from the caking coal or from metal abrasion of the apparatus in which the hot briquetting is carried out. Similar considerations apply to the production of silicon carbide or ferrosilicon.

The term "ferrosilicon" comprises for the purposes of the invention a metal alloy containing silicon, more particularly, with iron as metal.

OBJECTS OF THE INVENTION

It is an object of the invention to provide an improved process for making green briquettes which are completely satisfactory from the chemical or physical viewpoints are prepared without the use of hot briquetting.

Another object of my invention is to provide an improved apparatus for carrying out the method.

SUMMARY OF THE INVENTION

According to the invention, therefore, the process is performed by making shaped bodies which are free from melted or fused bituminous caking coal and whose specific gravity is made greater than the bulk density of quartz sand by adjustment of the proportions of the mixture and by compacting.

The shaped bodies are introduced for the heat treatment into a heated rotary-kiln furnace whose lower part is filled with quartz sand to an extent such that the heat treatment proceeds in a dip bed of quartz sand. The term "free from melted or fused bituminous caking coal" means that caking coal is virtually absent and, if present at all, is not present in a quantity such that the other carbon carriers and the quartz sand are bound by way of caking coal.

The invention is based on my discovery that shaped bodies of relatively low green strength which have been molded without caking coal—i.e. without being hot briquetted by means of a bituminous binder—can be so hardened in a rotary kiln furnace without decomposing that the finished briquettes meet all physical and chemical requirements when the heat treatment is given in a quartz sand dip bed and, therefore, virtually with the exclusion of air.

The grain size of the dip bed can correspond to the grain size of the sand mentioned previously.

The treatment time of the blank in the dip bed is adjusted to ensure adequate hardening. The hardening time is, for example, in the range of some 45 to 60 minutes. This is readily possible with modern rotary kiln furnace technology. The shaped bodies and, therefore, the finished briquettes can have diameters varying from a few millimeters to a few centimeters. They can be shaped in a pelleting plant as round pellets or pressed to other shapes by the shaping tools of a press, for example, to the shape of ovoid briquettes.

Advantageously, the process makes use of shaped bodies containing from 35 to 65 weight % of quartz sand and having a specific gravity of from 1.4 to 1.6 g/cm$^3$, while the bulk density of the quartz sand can of course be approximately 1.2 g/cm$^3$ or a little higher.

The temperature in the furnace should not be too high. Preferably, the revolving tubular furnace and therefore the quartz sand dip bed are heated to a final temperature of up to 500° C. Optimally, in the heat treatment the blanks undergo adequate degasification of heavy hydrocarbons and adequate low-temperature carbonization of the bituminous binder and carbon carrier in them.

Advantageously, the furnace is filled with quartz sand to an extent sufficient to ensure that the blanks do not rub against one another in the dip bed. According to the invention, to achieve this the furnace is filled with quartz sand at least to such an extent that the volume thereof is more than twice the void volume in a bulk fill of the corresponding quantity of shaped bodies in the furnace. The void volume is the sum of the volumes of the voids between the shaped bodies in a bulk fill.

The dip bed can according to the invention remain in the furnace, in which event just the finished green briquettes are removed by suitable means. Since the briquettes thus removed always carry away some of the sand from the dip bed, corresponding topping-up with fresh quartz sand is necessary.

In a preferred embodiment of the invention, which is distinguished by the simplicity of the process and which leads to further advantages to be discussed hereinafter, a considerable quantity of quartz sand of the dip bed is discharged from the furnace together with the finished green briquettes, at least some of such sand being returned hot to the furnace, the remainder being replaced by fresh quartz sand.

In this case, it is possible for the dip bed to have a special temperature profile, preferably so that the mixing of the recirculated hot quartz sand with the fresh quartz sand at the furnace entry produces in the blank-heating dip bed a temperature of approximately 200° C., which the heat of the furnace increases to approximately 500° C. at the furnace exit.

During the heat treatment first the heavy and then the lighter hydrocarbons evaporate from the shaped bodies. These hydrocarbons crack in the dip bed. Consequently, the hot quartz sand can be recirculated as often as is necessary for a strong envelope of carbon, in the form of solid crack carbon, to be formed on the discrete grains of quartz sand.

The simplest way to achieve this result is for the discrete sand grains to be recirculated about three times on the statistical average.

The grains having such an envelope can be used in a special way. To this end, according to the invention, the process is performed using blanks whose quartz sand content consists at least to some extent of recirculated quartz sand with a carbon envelope. Of course, the remaining cracking products are burned above the dip bed.

Advantageously, to produce green briquettes substantially devoid of impurities derived from the carbon carriers or the bituminous binders, the process is performed using shaped bodies having oil coke as carbon carriers and/or petroleum-based pitches as bituminous binders.

Petroleum-based pitches of use in the process according to the invention are commercially available with ash contents below 0.01 weight %, so that they contribute virtually no impurities. The coke yield of such pitches may reach 70T.

Petroleum coke, which is particularly suitable for the process according to the invention, has less than 0.2 weight % of undesirable constituents Similar considerations apply to quartz sand. These slight impurities have negligible effects. The petroleum coke is of course ground down to substantially the same grain size as the quartz sand. Preferably, the grain size is below 1 mm.

As previously stated, in the process according to the invention the blank can be shaped in various ways, for example, by means of a pelleting device outputting spherical pellets. However, it is simpler to work with blanks shaped by means of a briquetting press. In this event the specific weight of the blanks can be controlled in a simple way by the pressing step.

The invention also relates to an apparatus for performing the process described and comprising means for shaping the quartz sand blanks, a carbon carrier and a bituminous binder and means for heat-treating the blanks.

In such apparatus, the means for heat-treating the blanks can be a rotary-drum furnace having an entry for the blanks and an exit through which the green briquettes leave, the furnace being adapted to be heated to a sand bed temperature of up to approximately 500° C. by burners which burn into the furnace chamber, for example, for solid fossil fuels or gas fuels, and by combustion of the volatile constituents with additional air. The furnace has a quartz sand dip bed for the blanks, such bed partly filling the oven chamber in the region below the burners Preferably the furnace has a recirculating facility for the quartz sand of the dip bed, such facility interconnecting the furnace entry and furnace exit, the sand being adapted to be discharged together with the finished green briquettes and to be removable therefrom by screening and to be reintroducible into the furnace through the entry, and means for mixing-in fresh quartz sand. Of course, the gases and vapors evolved in the heat treatment and elsewhere in the apparatus are intercepted and cleaned or made harmless The invention also relates to green briquettes for the production of silicon or silicon carbide or ferrosilicon including silicon metal, as prepared by the process hereinbefore described.

BRIEF DESCRIPTION OF THE DRAWING

The above and other objects, features and advantages of my invention will become more readily apparent from the following description, reference being made to the accompanying highly diagrammatic drawing in which:

The sole FIGURE of which is a diagram which shows an apparatus for performing the process according to the invention.

SPECIFIC DESCRIPTION AND EXAMPLE

The apparatus illustrated is of use for the preparation of green briquettes for the production of silicon or silicon carbide.

Basically, the apparatus comprises means 1 for molding blanks consisting of quartz sand, a carbon carrier and a bituminous binder, and means 2 for heat treating the blanks The means 2 take the form of a rotary tube furnace 3 having an entry 4 for the blanks and an exit 5 through which the green briquettes leave after a programmable treatment time.

Burners 6 which burn into the furnace chamber heat the furnace 3 to a temperature of up to approximately 500° C. The furnace 3 has a quartz sand dip bed 7 for the blanks, the bed 7 partly filling up the furnace chamber in the region below the burners 6.

The furnace 3 also has a recirculating facility 8 for the quartz sand of the dip bed 7, such facility interconnecting the furnace entry 4 and furnace exit 5, the sand being adapted to be discharged together with the finished green briquettes and to be removable therefrom by screening by the screening facility 9.

The quartz sand removed by screening can be reintroduced hot through the entry 4 into the furnace 3.

Also disposed at the furnace entrance 4 are means 10 for introducing and mixing-in fresh quartz sand.

The means 1 for preparing the blanks are disposed upstream of the apparatus hereinbefore described, are combined therewith and comprise in the embodiment shown, two rotary drum mixers 11, a cooler 12 and a press 13 for shaping the blanks Petroleum coke is used in the embodiment.

The petroleum coke enters the first mixer 11 which is lined, for example, with SiC plates Since petroleum coke contains between 6 and 10% of water, it is dried and heated in the first mixer. Heating and drying are effected by using a proportion of the quartz sand used as heat vehicle in the furnace 3. The sand thus used has a temperature of 500° C.

The evaporation of the water and the heating requires so much energy that for an approximately half-and-half mixture of the petroleum coke and quartz sand an end temperature of approximately 150° C results. If this temperature is too low for the next step in which the binder must be admixed and intensively distributed, waste gas can be conveyed from the furnace 3 through the first mixer 11 in which it yields heat and is saturated with vapors. The waste gas has a temperature of approximately 650° C.

Also, thanks to its reduced oxygen content of less than 1.5%, the waste gas can render the atmosphere in the first mixer 11 inert (monooxidizing), thus minimizing dangerous situations which might be caused by powdered petroleum coke. After the mixer 11 the waste gas goes, for example, by way of a loose-fill filter having an independent system of filling of petroleum coke or quartz sand, to the flue.

The mixture of sand and petroleum coke, which is now at a temperature of approximately 200° C., goes to the second mixer 11 in which the binder is sprayed at a temperature of approximately from 180° to 200° C. The binder may be a petroleum-based pitch. The temperatures are such that the viscosity is low enough to prevent caking and to ensure fine distribution in the mixture of solids. The second mixer 11 also has a lining of SiC plates. This lining feature is used wherever possible in order to reduce wear to a minimum and to enable any material which does rub off to be incorporated readily in the product.

The mixture issuing from the second mixer 11 is too hot for briquetting since it sticks readily to the press surface. The mixture is therefore cooled in the cooler by from 30° to 50° C., depending upon the nature of the binder. The cooler 12 also has SiC plates. The cooling can be by countercurrent air cooling. The quantity of cooling air depends upon the required end temperature of the mixture to be briquetted.

The mixture to be briquetted goes to the press 13. The same is enclosed and has controlled ventilation. The press 13 outputs the blanks which are hardened in the heat treatment means 2. Hardening in the present case denotes degassing and pre-coking of the binder and petroleum coke in the briquette.

The furnace 3 is less than half-full of quartz sand used in the preparation of the green briquettes. The furnace 3 has, for example, a length of from 20 to 30 m and an internal diameter of from 2 to 3 m. The length depends upon the temperature profile for heating the blanks. The furnace contents are heated by a direct flame which is maintained in the remaining free space.

The first source of fuel for the flames is by way of the burners 6 which flame into the oven 3 and the second source is the volatile constituents of the blanks When the blanks are heated the binder starts to evolve heavy hydrocarbons at temperatures above 250° C. This evolution continues substantially up to 450° C., whereafter evolution shifts to smaller molecules such as methane and hydrogen. The sum of the fuels is matched in dependence upon the initial and final temperature of the solids and upon the total throughput.

The quartz sand filling in the embodiment comprises two components—a proportion of hot recycled quartz sand, and a proportion of fresh sand. The fresh sand is directly proportional to output—i.e., the higher the hourly output of green briquettes, the more fresh sand is required Conversely, an increase in throughput leads to an increase in the evolution of volatile constituents which burn. Throughput is therefore limited by the permissible combustion chamber loading of the furnace 3. On the assumption that an end temperature of the solids of approximately 500° C. is required, the temperature of the hot gases must be at least 800° C., preferably in concurrent operation.

The blanks can be given a defined treatment in the dip bed 7. Hence the specific weight of the blanks can be selected. This specific weight can be adjusted between 1.35 to 1.55 $g/cm^3$ in dependence upon the proportion of quartz sand and upon the briquetting pressure in the press 13. This compares with a bulk density of moving quartz sand with a narrow band of grain sizes of from 1.2 to 1.4 $g/cm^3$.

This comparison shows that the blanks can be degassed very thoroughly in the quartz sand of the dip bed. The blanks are therefore protected against burning away.

The strength reached is surprising. Of equal importance is a secondary effect. After heavy hydrocarbons have been evolved from the blanks, these organic substances are compelled to escape through the hot quartz sand of the bed 7 into the free space of the furnace 3. In contact with the quartz sand, these substances are to some extent so decomposed that the quartz sand absorbs carbon and lighter hydrocarbons and hydrogen can leave the quartz sand and burn thereabove. This coating of the quartz sand with crack carbon leads to a quartz sand which ceases to offer the hardness of quartz to pressing operations in the press 13 since the surface of the sand grains has a sufficiently thick layer of relatively soft carbon.

molding roll 8 and a third molding roll 9. Thus to the product in the thus completely cured state was applied the twisting treatment in the 90° twisted state by means of the molding die and the molding jig, and it was set in this state resulting in a fiber reinforced plastics linear material as shown in FIG. 3 that is continuously wound on a winding machine as the final a product. In the above example, molding of the resin impregnated reinforcing fiber and complete curing are conducted at the same time by means of the molding die 3. It is also possible that the resin curing furnace 10 is provided between the molding die 3 and the heating furnace 20, and the material according to the invention is semicured by means of the molding die 3, completely cured in the resin curing furnace 1), and then introduced into the heating furnace 20. Even in a case where it is semicured by means of the molding die, twisting may be applied while completely curing the material in the heating furnace 20 at a temperature of not lower than Tg without providing a resin curing furnace 10.

In the above examples, the curing of the resin is carried out by heating, but it is not limited thereto, and the resin may be cured by irradiation with ultraviolet rays, electron beams and the like. In addition, the twisting may be carried out at predetermined intervals positively and negatively by rotating left the whole of the twisting jig 6 comprising the first to third molding rolls 7 to 9 shown in FIGS. 2 and 5 relative to the direction of transferring the resin and then rotating right. Although in the above examples one or two sets of twisting jigs are used, more than two jigs can be used. It is also possible that the twisting jigs 6, 11 are not used, but rather the pulling conveyor 12 is positioned so that the material is twisted relative to the fiber reinforced plastics linear material, thus using the pulling conveyor itself as a twisting jig. THe fiber reinforced plastic linear material obtained is not limited to one having the cross-sectional form shown in FIG. 3, and those having the cross-sectional views shown in FIGS. 6 to 12 can be produced by appropriately selecting the cross-sectional shape of the molding die. Moreover, it is not limited to the provision of the groove in the spiral form relative to the lengthwise direction of the fiber reinforced plastics linear material as shown in FIGS. 6 to 12 (the numbers in the drawings indicate the dimensions and the unit is mm), and the projection in the form of may be formed. The twisting treatment may be applied to material having crosssectional forms such as an oval, a rectangle, or and the like and a groove or grooves.

In accordance with the process for producing the fiber reinforced plastic linear materials of the present invention, the fiber reinforced plastic linear material can be produced continuously and, therefore, the twisting treatment can be applied without damaging the reinforcing fiber and a fiber reinforced plastic linear material having excellent heat resistance and mechanical strength which is twisted in the circumferential direction can be produced. That is, in accordance with the above method, a continuous filament bundle in the fiber reinforcing linear material is not substantially broken irrespective of the presence of the groove formed. Therefore, the linear material has excellent tensile force in the lengthwise direction and is suitable as a tension member.

One pitch of the spiral such as the groove of the fiber reinforced plastic linear material obtained according to the present invention is usually at least 10 cm and generally about 10 to 100 cm. In particular, when it is used as a tension member for optical fibers, one pitch is about 10 to 100 cm.

The reinforcing fiber content in the fiber reinforced plastic linear materials obtained by the present invention is usually about 45 to 75 vol%. When an inorganic fiber such as glass roving, carbon fiber roving and the like is used as the reinforcing fiber, the reinforcing fiber is in a tensioned state in the cured resin matrix of the linear material obtained, and it is excellent in the tension force in the lengthwise direction.

The fiber reinforced plastic linear materials obtained by the above method is not limited to a tension member and the like for optical fibers, but can be used in other applications such as an agricultural pole, a tension material for concrete and the like. When it is used as a tension member for optical fibers, the optical fiber is placed in the groove and, in general, a plastic tape is wound thereon to produce an optical fiber unit.

The present invention is hereinafter explained in detail by reference to the following Production Examples.

PRODUCTION EXAMPLE 1

A glass roving was used as the reinforcing fiber, and a resin bath was filled with a liquid resin composition prepared by uniformly mixing a vinyl ester resin and benzoyl peroxide. Using the apparatus shown in FIG. 1, a fiber reinforced plastic linear materials was continuously produced at a pulling speed of 1.5 m/min while introducing forcedly a resin impregnated roving into a forming die (while squeezing the liquid resin composition at the inlet of the molding die).

The molding die 3 had a cross-shaped hole in the lengthwise direction, and a length of 500 mm, and was set at a temperature of 80° C. A resin curing furnace (length 1 m) was maintained at 130° C, and a twisting jig as shown in FIG. 5 was provided in the vicinity of the inlet and outlet of the furnace.

In this example, the semi-cured resin impregnated reinforcing fiber just before entering into the resin curing furnace 10 was twisted in the furnace and completely cured in the furnace, and a fiber reinforced plastic linear materials (one pitch of the groove: 15 cm) having a form shown in FIG. 6 was obtained.

PRODUCTION EXAMPLE 2

A glass roving was used as the reinforcing fiber, and the resin bath was filled with a liquid resin composition prepared by uniformly mixing a vinyl ester resin and benzoyl peroxide. Using the apparatus shown in FIG. 1 (the resin curing furnace 10 was provided), a fiber reinforced plastic linear materials was continuously produced at a pulling speed of 1.0 m/min while forcedly introducing a resin impregnated roving in a molding die.

The molding die 3 had a grooved circular hole in the lengthwise direction and a length of 1000 mm, and set at a temperature of 130° C.

The resin curing furnace 10 (length 2 m) was maintained at 200° C. and the resin was completely cured in the furnace.

The heating furnace 20 (length 1 m) was set at 200° C. (Tg of the resin cured product: 150° C.) and at the same time, the twisting treatment was applied using a twisting jig 6 as shown in FIG. 5 at a position where it left the heating furnace.

According to this method, the completely cured resin impregnated reinforcing fiber is twisted in the heating furnace 20 at a temperature of not lower than Tg to Loading in the press 13 lasts only for fractions of a second and does not lead to contacting between steel and quartz which would otherwise erode the press 13.

The bonding of the coated quartz sand to the finished green briquette is the second advantage associated with reduction in a low-shaft electric furnace. Previously briquettes prepared with binders were unsatisfactory in low-shaft electric furnaces first because they softened with heating, second because they disintegrated due to the binder filling and third because the SiC reaction destroyed the binding residual structures. The invention obviates all these disadvantages. The hardening described obviates softening and distillation of the bituminous binder in the low-shaft electric furnace. The SiC reaction which in the event of direct contact between quartz sand and coke from the binder destroys the stabilizing hydrogen structure of the briquette above 1500° C. proceeds initially with the carbon enveloping the grain of quartz sand. This does not impair the structure of the coke which has evolved from the binder. Briquette strength stays constant over a longer time or up to a higher temperature than previously in the low-shaft electric furnace, at least up to the melting point of the quartz sand in the briquette, which is above 1700° C.

After the quartz sand and the finished green briquettes have passed through the furnace 3, they are separated from one another by screening. The green briquettes go to a bunker with protection from oxygen. That proportion of the quartz sand which is required for production is supplied to the first mixer 11 and mixed with petroleum coke, the same being dried in this step. The mixture proportions can be chosen freely. It has been found in practice, however, that for silicon production briquette compositions representing a molar ratio of quartz sand to C of from 1 to 5 or 6 mol are advantageous. For silicon carbon production a ratio of quartz sand to be fixed carbon of 1:3 can be used. For other productions which have not been tested proportions can be varied to suit requirements. The limit is the specific weight of the blanks which ensures that the blanks float while dipped in the dip bed 7 right from the start.

I claim:

1. A process for making green briquettes for use in the production of silicon, silicon carbide, or ferrosilicon in a low-shaft electric furnace, the process comprising the steps of:
   (a) preparing a mixture substantially free from molten bituminous caking coal but containing quartz sand, a carbon carrier and a bituminous binder;
   (b) shaping said mixture into blanks with compaction and controlling the composition of said mixture and the degree of compaction of said blanks so that said blanks have a specific weight less than the bulk density of quartz sand; and
   (c) hardening said blanks to form said green briquettes by heat treating said briquettes in immersion into an agitated sand bath by introducing said blanks into a heated rotating-drum furnace having a lower part filled with quartz sand so that said blanks are treated in a dip bed of the quartz sand for a period of time and at a temperature sufficient to harden said blanks.

2. The process defined in claim 1 wherein said blanks contain from 35 to 65 weight % of quartz sand and have a specific weight of from 1.4 to 1.6 g/cm$^3$.

3. The process defined in claim 1 wherein the furnace and therefore the quartz sand dip bed are heated to a final temperature of up to 500° C.

4. The process defined in claim 1 wherein the heat treatment is carried out so that the blanks undergo very complete degasification of heavy hydrocarbons and low-temperature carbonization of the bituminous binder and carbon carrier in them.

5. The process defined in claim 1 wherein the furnace is filled with quartz sand to such an extent that the volume thereof is more than twice the void volume in a bulk fill of the blanks.

6. The process defined in claim 1 wherein the quartz sand of the dip bed is discharged from the furnace together with the finished green briquettes, at least some of such sand being returned hot to the furnace, the remainder being replaced by fresh quartz sand.

7. The process defined in claim 6 wherein the mixing of the recirculated hot quartz sand with the fresh quartz sand at the furnace entry produces in the dip bed a temperature of approximately 200° C., which is increased up to approximately 500° C. at the furnace exit.

8. The process defined in claim 6 wherein the hot quartz sand is recirculated as often as is necessary for a strong envelope of carbon to be formed on discrete grains of quartz sand.

9. The process defined in claim 8 wherein the discrete sand grains are on the statistical average circulated about three times.

10. The process defined in claim 8 wherein said blanks contain quartz sand consisting at least to some extent of recirculated quartz sand with a carbon envelope.

11. The process defined in claim 1 wherein oil coke is said carbon carrier.

12. The process defined in claim 1 wherein petroleum-based pitch is said bituminous binder.

* * * * *